United States Patent
Yu

(10) Patent No.: US 10,185,369 B1
(45) Date of Patent: Jan. 22, 2019

(54) ELECTRONIC DEVICE WITH HINGE STRUCTURE AND METHOD FOR MANUFACTURING SIGNAL CONNECTION UNIT THEREOF

(71) Applicant: Wistron Corp., New Taipei (TW)

(72) Inventor: Ching Jen Yu, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 16/035,567

(22) Filed: Jul. 13, 2018

(30) Foreign Application Priority Data

May 14, 2018 (TW) .............................. 107116278 A

(51) Int. Cl.
*G06F 1/16* (2006.01)
(52) U.S. Cl.
CPC .......... *G06F 1/1683* (2013.01); *G06F 1/1616* (2013.01); *G06F 1/1681* (2013.01)
(58) Field of Classification Search
CPC .... G06F 1/1681; G06F 1/1683; G06F 1/1616; H01R 35/00; H01R 35/04; H01R 39/64
USPC ........................................................ 16/385
See application file for complete search history.

(56) References Cited

U.S. PATENT DOCUMENTS

| | | | |
|---|---|---|---|
| 5,897,382 A * | 4/1999 | Takahashi | G06F 1/1616 361/729 |
| 6,370,020 B1 | 4/2002 | Toukairin | |
| 2004/0038719 A1 * | 2/2004 | Lee | G06F 1/1616 455/575.7 |
| 2006/0048340 A1 * | 3/2006 | Zaderej | G06F 1/1616 16/385 |
| 2014/0220790 A1 * | 8/2014 | Lee | E05D 11/0081 439/31 |
| 2015/0211273 A1 * | 7/2015 | Chiang | G06F 1/1633 16/223 |
| 2016/0182132 A1 * | 6/2016 | Pelissier | G06F 1/1632 455/41.1 |
| 2018/0052497 A1 * | 2/2018 | Maatta | G06F 1/1681 |
| 2018/0115131 A1 * | 4/2018 | Kohen | H01R 13/625 |
| 2018/0120896 A1 * | 5/2018 | Wallace | G06F 1/1624 |

FOREIGN PATENT DOCUMENTS

| | | |
|---|---|---|
| JP | 2005-348341 A | 12/2005 |
| TW | 200907643 A | 2/2009 |
| TW | 201434376 A | 9/2014 |
| TW | I612871 B | 1/2018 |

* cited by examiner

*Primary Examiner* — Hoa C Nguyen
*Assistant Examiner* — Christopher L Augustin

(57) ABSTRACT

An electronic device with a hinge structure is provided, including a first member and a second member. The first member includes a signal connection unit. The signal connection unit includes a plurality of conductive elements and a plurality of spacers. The conductive elements include a first conductive element and a second conductive element. The first conductive element includes a first annular portion and a first extending portion. The second conductive element includes a second annular portion and a second extending portion. The spacers include a first spacer and a second spacer. The first spacer separates the first annular portion from the second annular portion. The second spacer abuts the second annular portion. The second member is connected to the first member, and is adapted to be rotated relative to the first member.

16 Claims, 22 Drawing Sheets

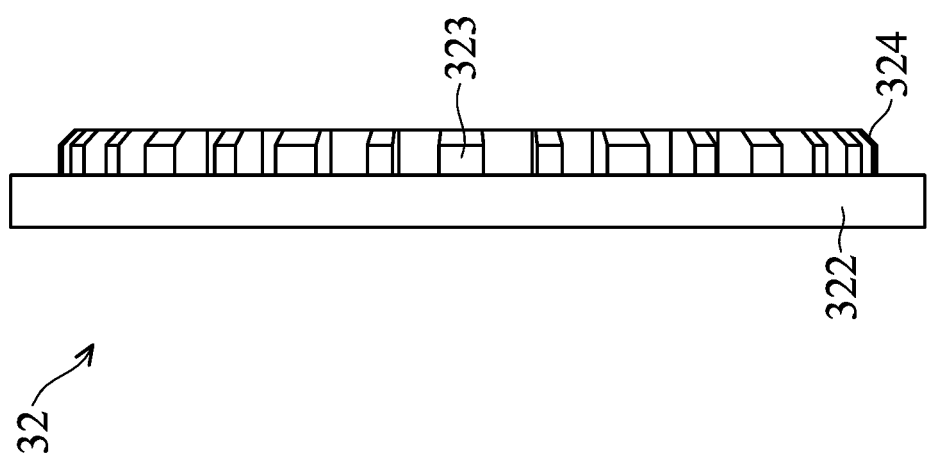

ELECTRONIC DEVICE WITH HINGE STRUCTURE AND METHOD FOR MANUFACTURING SIGNAL CONNECTION UNIT THEREOF

CROSS REFERENCE TO RELATED APPLICATIONS

This Application claims priority of Taiwan Patent Application No. 107116278, filed on May 14, 2018, the entirety of which is incorporated by reference herein.

BACKGROUND OF THE INVENTION

Field of the Invention

The present invention relates to an electronic device, and in particular to an electronic device with a hinge structure.

Description of the Related Art

Conventional electronic devices, such as notebooks, may include a first member (the computer host) and a second member (the screen). The second member pivots on the first member by the action of a hinge. Conventionally, the first member is electrically connected to the second member by a cable that extends between the two members. The cable passes through the hinge. However, the space near the hinge is limited, and there is often insufficient space for the route followed by the cable. Additionally, the cable may become worn and damaged over time by repeated rotation of the hinge.

BRIEF SUMMARY OF THE INVENTION

In one embodiment, an electronic device is provided. The electronic device includes a first member and a second member. The first member includes a first signal line, a shaft, an elbow connector and a signal connection unit. The elbow connector is coupled to the first signal line, wherein the elbow connector is telescoped on the shaft. The signal connection unit is telescoped on the shaft, which includes a plurality of conductive elements and a plurality of spacers. The conductive elements include a first conductive element and a second conductive element, wherein the first conductive element includes a first annular portion and a first extending portion, the first annular portion is connected to one end of the first extending portion, the second conductive element includes a second annular portion and a second extending portion, the second annular portion is connected to one end of the second extending portion, and the first extending portion is parallel to the second extending portion. The spacers include a first spacer and a second spacer, wherein the first spacer separates the first annular portion from the second annular portion, the first spacer includes a plurality of first spacer holes, the first extending portion passes through one of the first spacer holes, the second spacer abuts the second annular portion, the second spacer includes a plurality of second spacer holes, the first extending portion passes through one of the second spacer holes, the second extending portion passes through another second spacer hole, and the second spacer is located between the elbow connector and the second annular portion. The second member is connected to the first member, wherein the second member is adapted to pivot relative to the first member. The second member includes a pivot connector. The pivot connector is connected to the signal connection unit, wherein the pivot connector is adapted to couple the first annular portion to the second annular portion.

In another embodiment, a method for manufacturing a signal connection unit is provided. The method for manufacturing a signal connection unit includes the following steps. First, a plurality of conductive elements are provided, wherein the conductive elements include a first conductive element and a second conductive element, the first conductive element includes a first annular portion and a first extending portion, the first annular portion is connected to one end of the first extending portion, the second conductive element includes a second annular portion and a second extending portion, and the second annular portion is connected to one end of the second extending portion. Next, a plurality of spacers are provided, wherein the spacers include a first spacer and a second spacer, the first spacer includes a plurality of first spacer holes, and the second spacer includes a plurality of second spacer holes. Then, the first extending portion passes through one of the first spacer holes, wherein the first annular portion is connected to the first spacer. Next, the second extending portion passes through one of the second spacer holes, wherein the second annular portion is connected to the second spacer. Then, the first extending portion passes through another second spacer hole, wherein the second annular portion abuts the first spacer.

In one embodiment, the method for manufacturing a signal connection unit further includes the following steps. First, a first fastener and a second fastener are provided, wherein the second fastener includes a plurality of fastener holes. Then, the first fastener is wedged to one of the spacers. Next, the first extending portion passes through one of the fastener holes, and the second extending portion passes through another fastener hole. Then, the first extending portion and the second extending portion are cut off. Next, free ends of the first extending portion and the second extending portion are bent, wherein a first bending portion is formed on the free end of the first extending portion, a second bending portion is formed on the free end of the second extending portion, and the spacers are located between the first fastener and the second fastener.

In the embodiments of the invention, the signal connection unit directly connects the pivot connector to electrically connect the first member and the second member. The conventional wire is omitted, and conventional problems such as insufficient route space and cable damage are prevented. Additionally, the conductive elements of the embodiment of the invention can easily be combined with the spacers, to become a signal connection unit with a plurality of pins. As well, utilizing the notch of the conductive element, the electronic device can provide functions such as auto screen sleeping, auto screen lighting up, volume adjustment, silent, auto screen flip, close window, or full screen, without an additional sensor.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 3C shows a chamfered edge of a telescoping portion of the embodiment of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
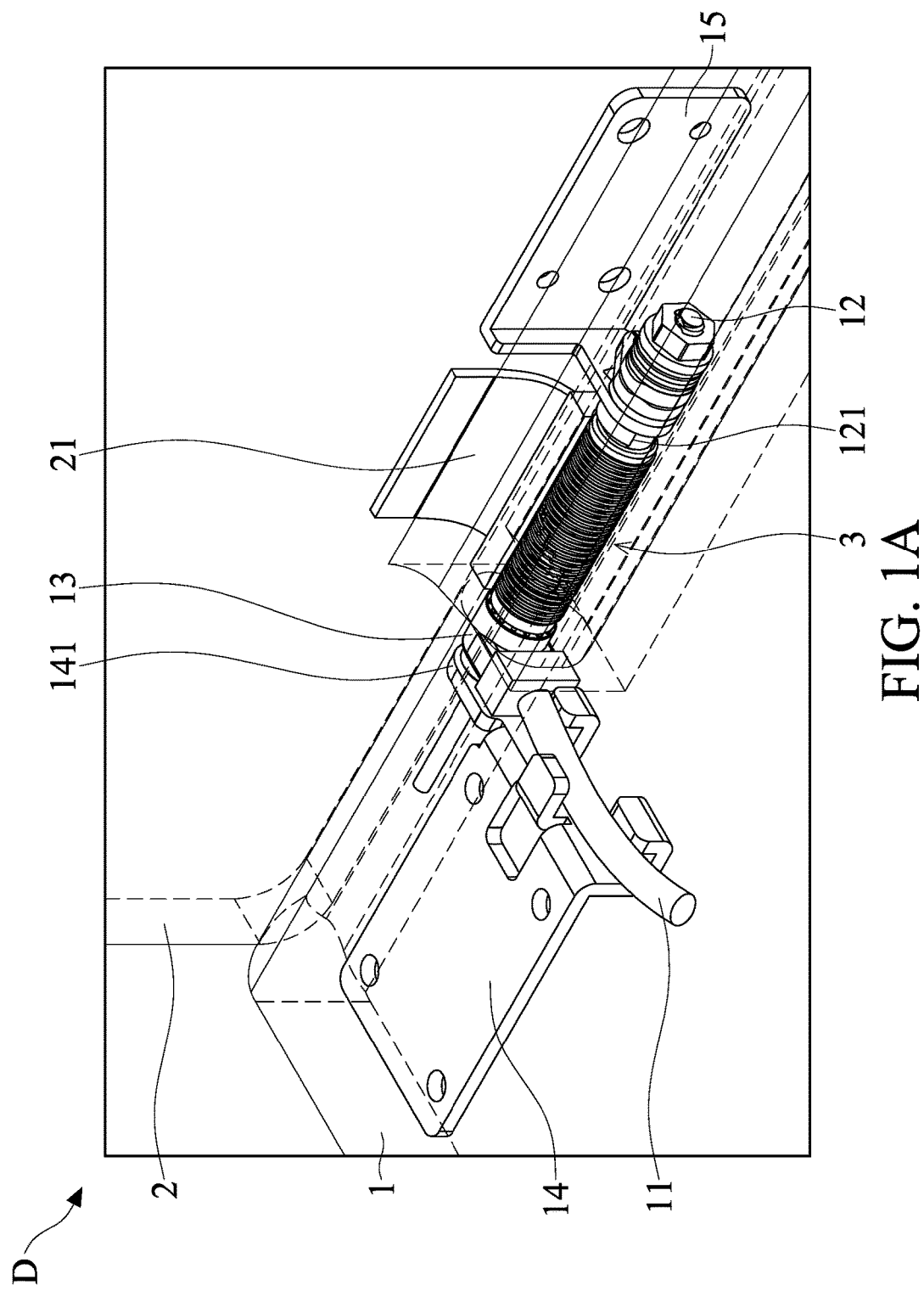
FIG. 1A shows an electronic device with a hinge structure of the embodiment of the invention.
Figure 1B:
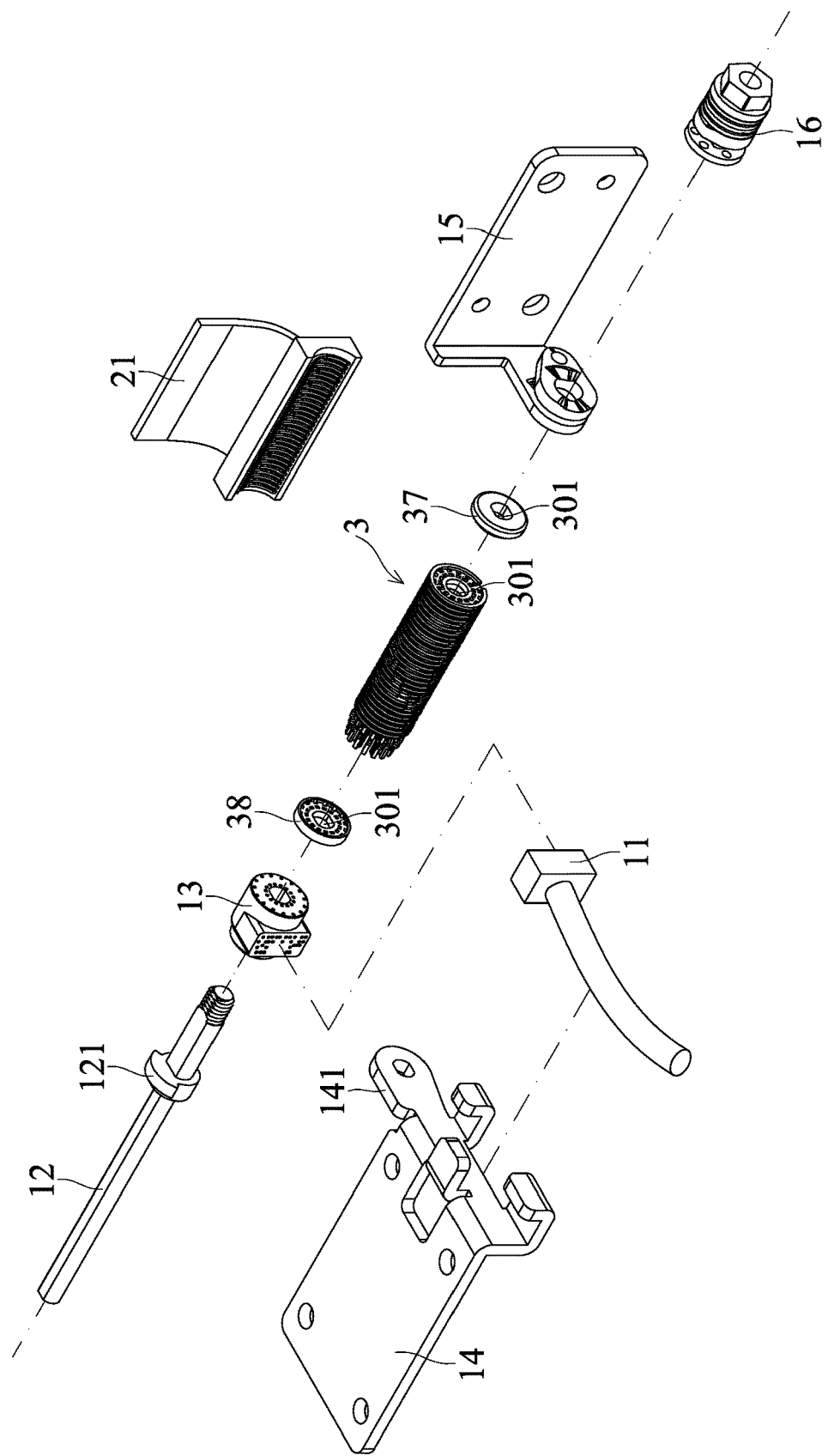
FIG. 1B is an exploded view of the hinge structure of the embodiment of the invention.

FIG. 1A shows an electronic device D with a hinge structure of the embodiment of the invention. FIG. 1B is an exploded view of the hinge structure of the embodiment of the invention. With reference to FIGS. 1A and 1B, the electronic device D of the embodiment of the invention includes a first member 1 and a second member 2. The first member 1 includes a first signal line 11, a shaft 12, an elbow connector 13 and a signal connection unit 3. The elbow connector 13 is coupled to the first signal line 11. The elbow connector 13 is telescoped on the shaft 12. The signal connection unit 3 is telescoped on the shaft 12.

With reference to FIG. 1B, in one embodiment, the first member 1 further includes a torque unit 16. The torque unit 16 is telescoped on the shaft 12 to provide torque to the second member 2.

Figure 2A:
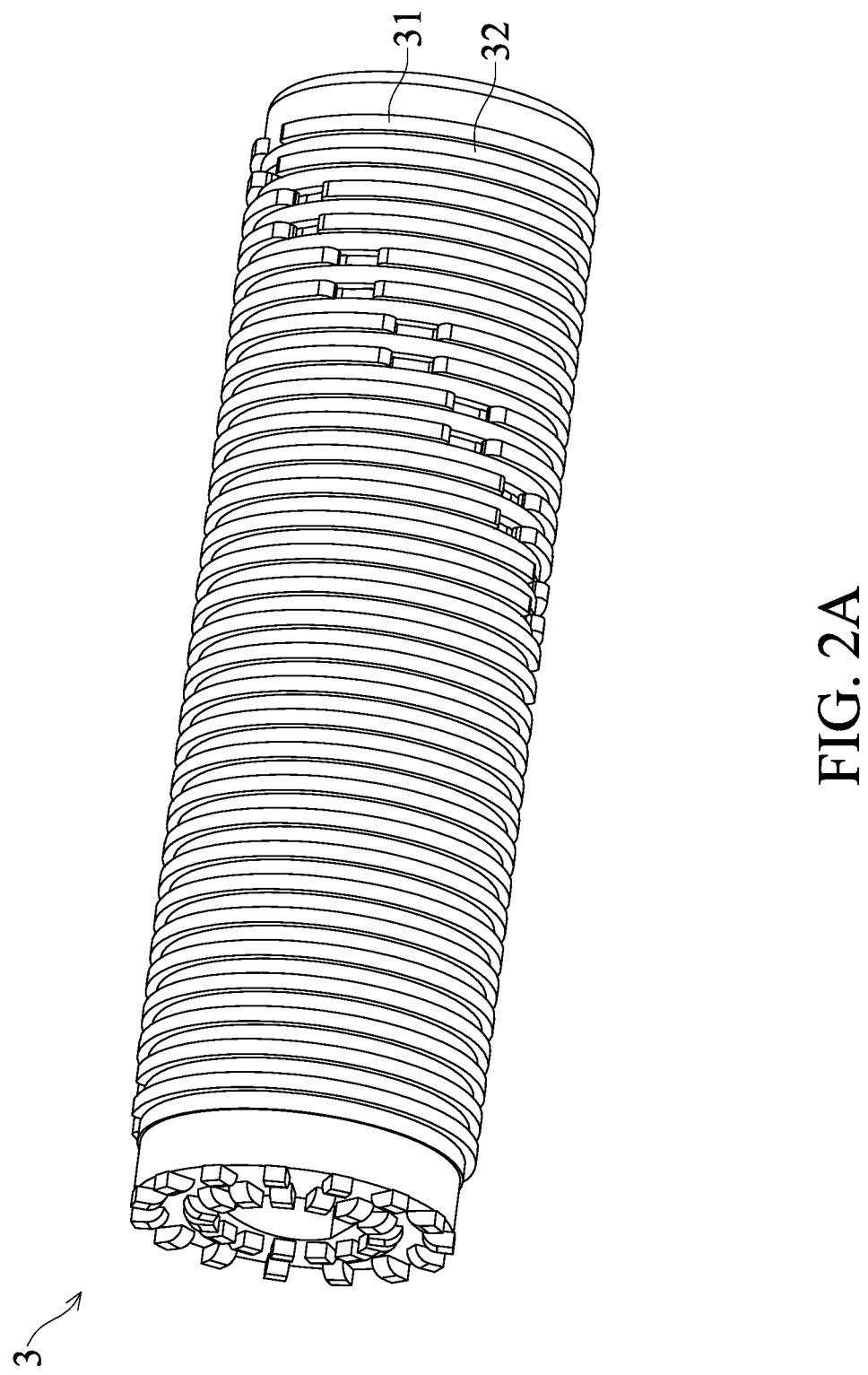
FIG. 2A is an assembled view of a signal connection unit of the embodiment of the invention.
Figure 2B:
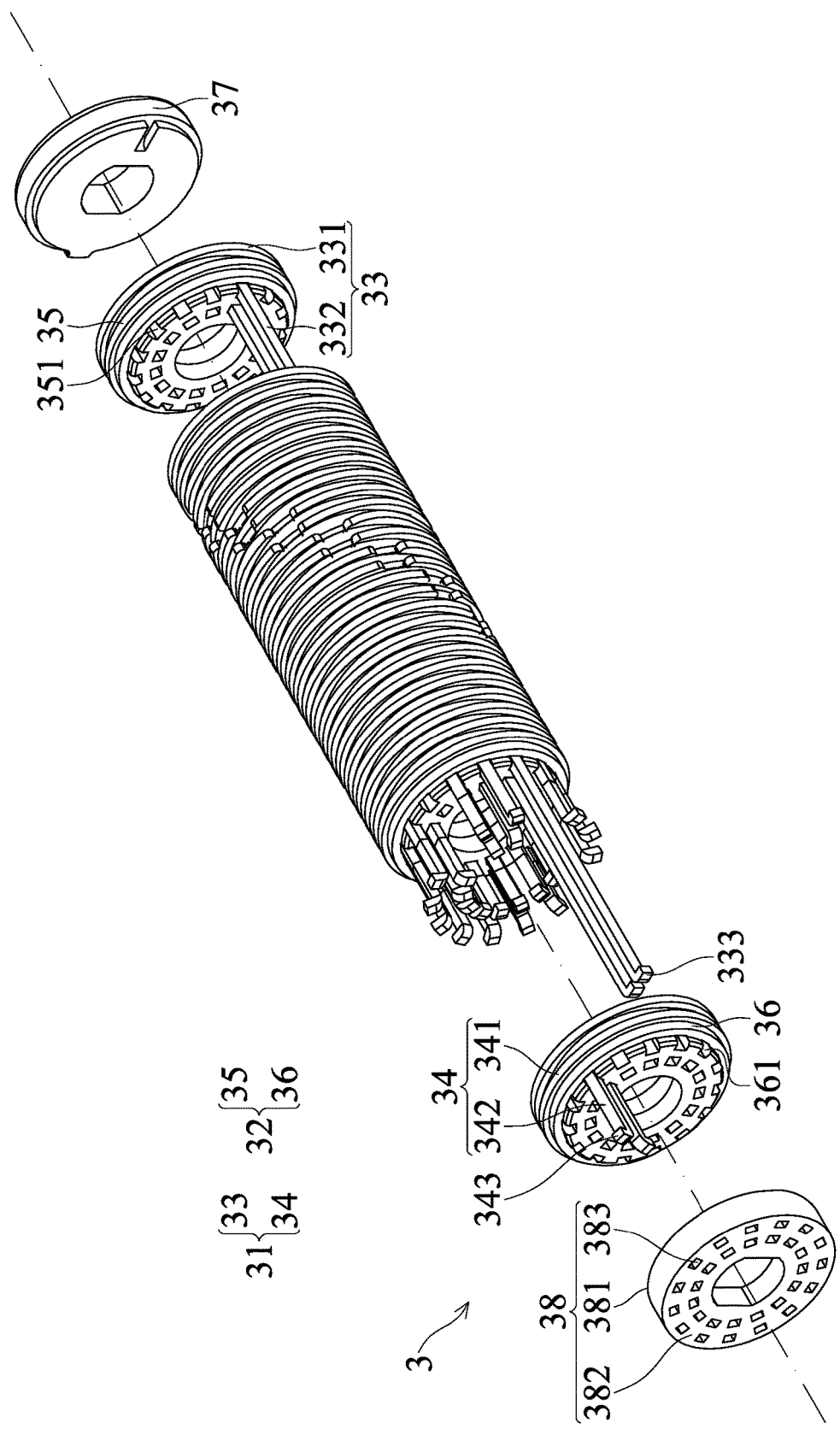
FIG. 2B is an exploded view of the signal connection unit of the embodiment of the invention.
Figure 3A:
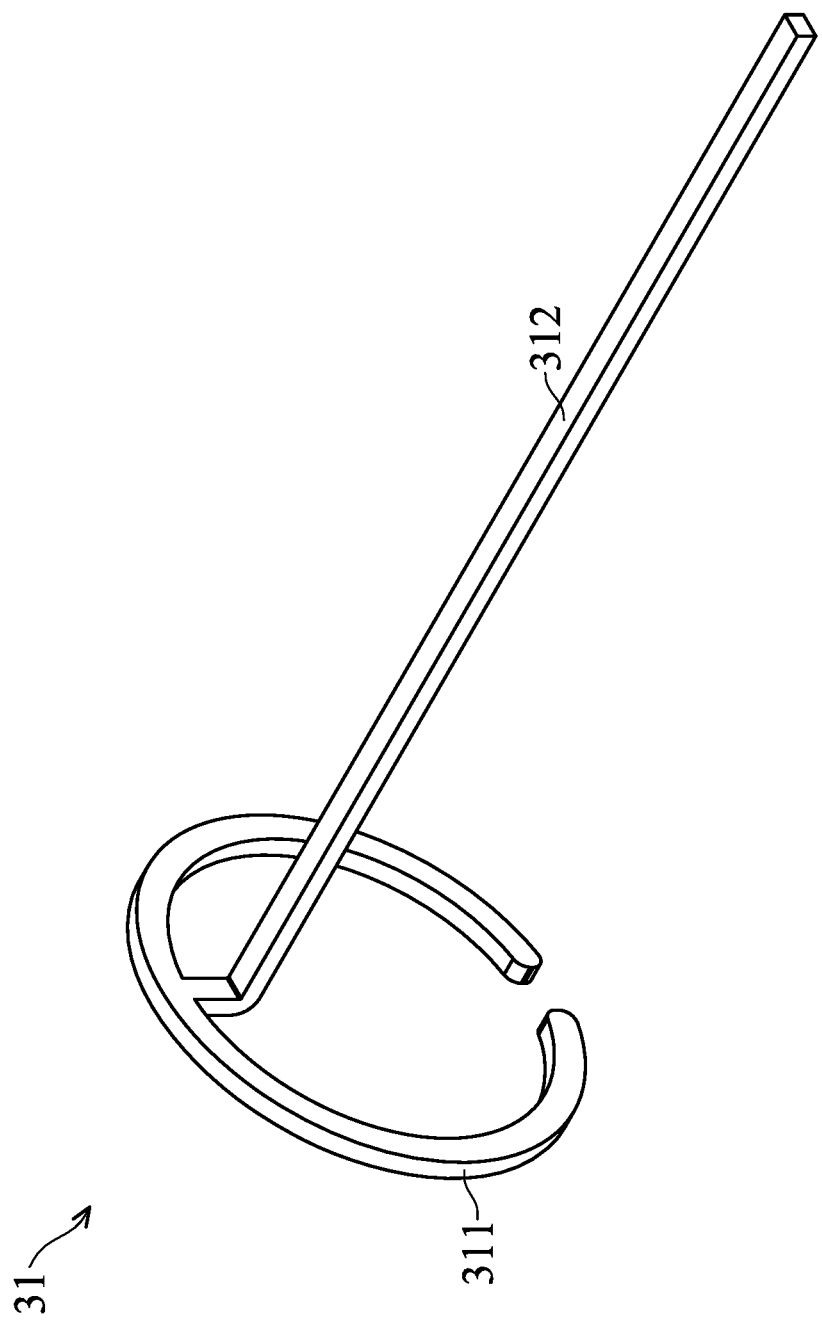
FIG. 3A shows the details of a conductive element of the embodiment of the invention.
Figure 3B:
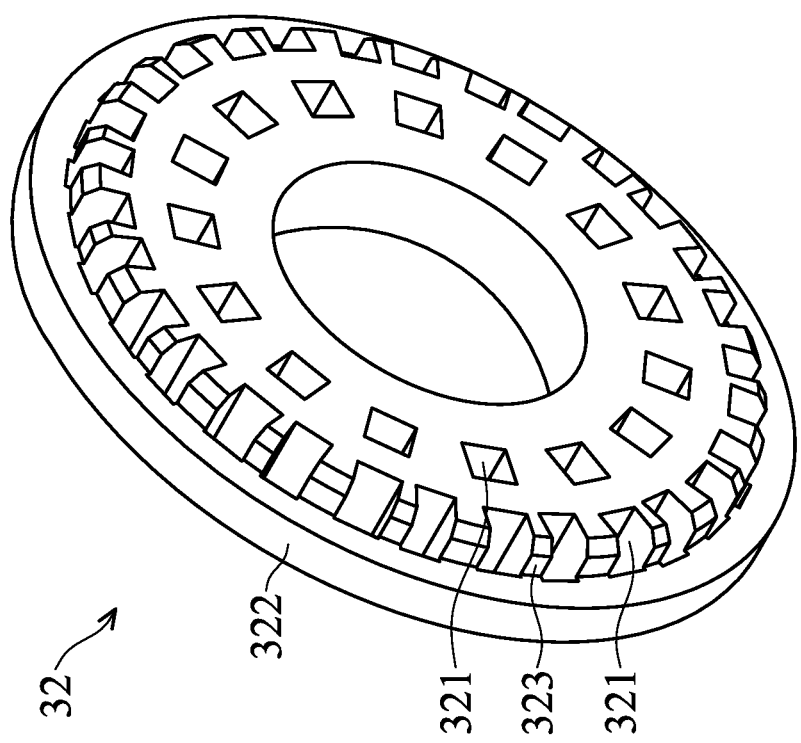
FIG. 3B shows the details of a spacer of the embodiment of the invention.

FIG. 2A is an assembled view of the signal connection unit 3. FIG. 2B is an exploded view of the signal connection unit 3. With reference to FIGS. 2A and 2B, the signal connection unit 3 includes a plurality of conductive elements 31 and a plurality of spacers 32. FIG. 3A shows the details of the conductive element 31. FIG. 3B shows the details of the spacer 32. With reference to FIGS. 2A, 2B, 3A and 3B, the conductive element 31 includes a first conductive element 33 and a second conductive element 34. The first conductive element 33 includes a first annular portion 331 and a first extending portion 332. The first annular portion 331 is connected to one end of the first extending portion 332. The second conductive element 34 includes a second annular portion 341 and a second extending portion 342. The second annular portion 341 is connected to one end of the second extending portion 342. The first extending portion 332 is parallel to the second extending portion 342. The spacers 32 include a first spacer 35 and a second spacer 36. The first spacer 35 separates the first annular portion 331 and the second annular portion 341. The first spacer 35 includes a plurality of first spacer holes 351. The first extending portion 332 passes through one of the first spacer holes 351. The second spacer 36 abuts the second annular portion 341. The second spacer 36 includes a plurality of second spacer holes 361. The first extending portion 332 passes through one of the second spacer holes 361. The second extending portion 342 passes through another second spacer hole 361. The second spacer 36 is located between the elbow connector 13 and the second annular portion 341.

FIG. 2B is a schematic view. The locations and the sizes of the elements in FIG. 2B are not meant to restrict the invention. For example, in the assembly process, the actual length of the first extending portion 332 is shorter than what is shown in FIG. 2B.

With reference to FIGS. 1A and 1B, in one embodiment, the second member 2 is connected to the first member 1. The second member 2 is adapted to pivot relative to the first member 1. The second member 2 includes a pivot connector 21. The pivot connector 21 is electrically connected to the second member 2. The pivot connector 21 is connected to the signal connection unit 3, wherein the pivot connector 21 is adapted to couple the first annular portion 331 to the second annular portion 341.

In one embodiment, a hinge structure of the embodiment of the invention includes the shaft 12, the signal connection unit 3 and the pivot connector 21.

In one embodiment, the electronic device is a notebook. The first member 1 is a computer host. The second member 2 is a screen. The signal connection unit 3 electrically connects the first member 1 and the second member 2.

In the embodiment above, the first conductive element 33 and the second conductive element 34 are utilized to explain the relationship between the conductive elements 31 and the spacers 32. However, the disclosure is not meant to restrict the invention. The number of conductive elements 31 can be changed. Similarly, in the embodiment above, the first spacer 35 and the second spacer 36 are utilized to explain the relationship between the conductive elements 31 and the spacers 32. However, the disclosure is not meant to restrict the invention. The number of spacers 32 can be changed.

Figure 3D:
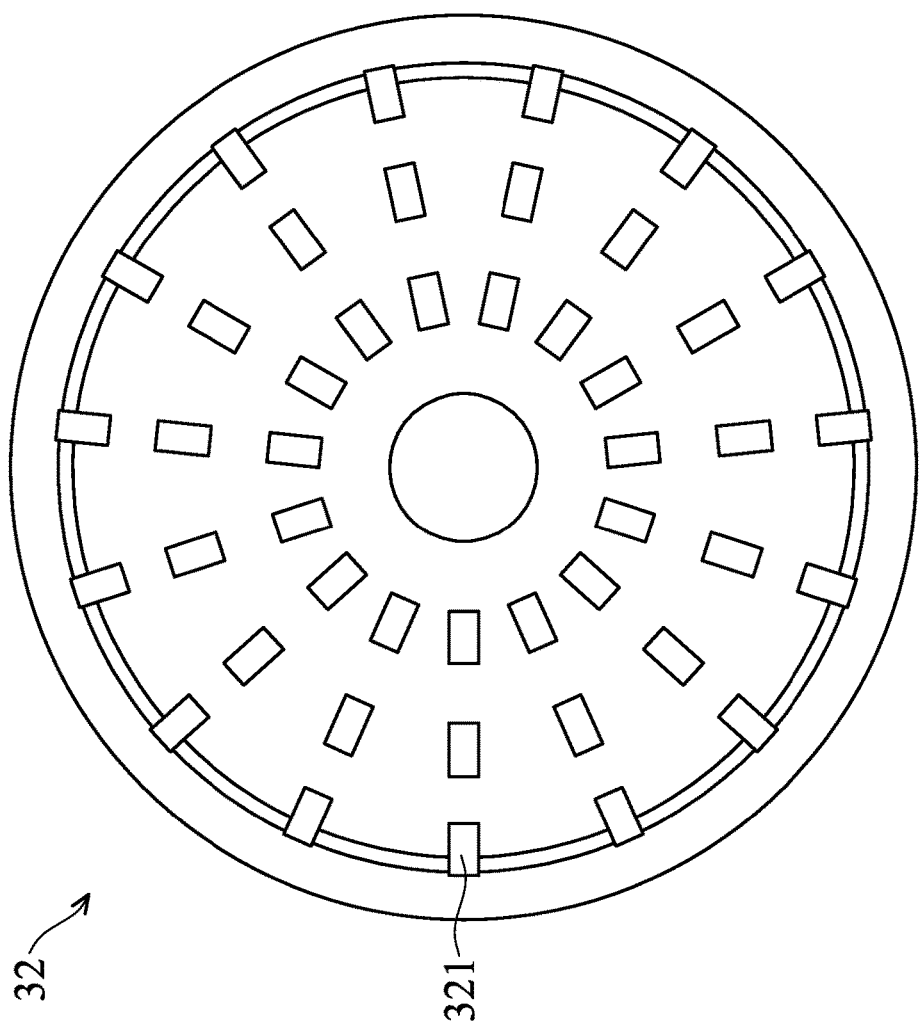
FIG. 3D shows a plurality of spacer holes of the embodiment of the invention being arranged in three circles.
Figure 3E:
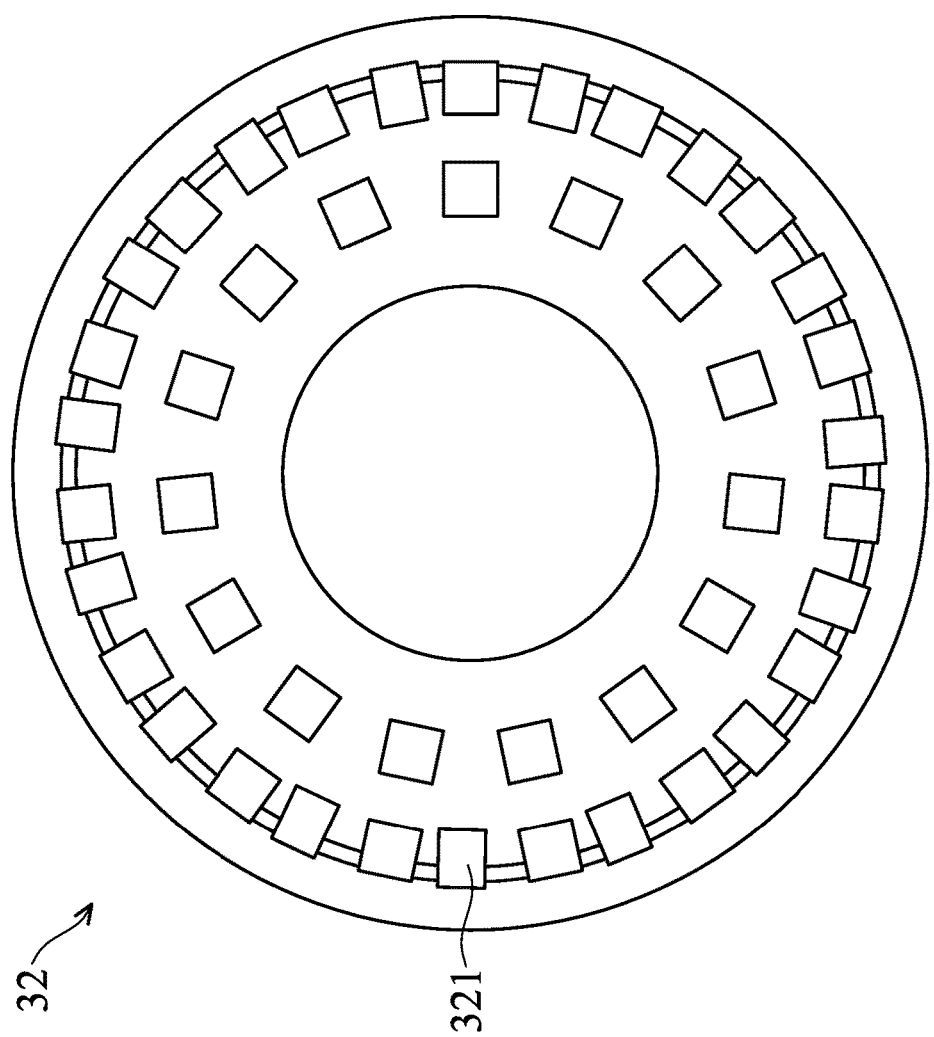
FIG. 3E shows a plurality of spacer holes of the embodiment of the invention being arranged in a staggered configuration.

With reference to FIG. 3B, in details, each spacer 32 includes a plurality of spacer holes 321. The spacer holes 321 are arranged in the circumferential direction of the spacer 32. In the embodiment, two of the spacer holes 321 are arranged as a pair in the radial direction of the spacer 32. With reference to FIG. 3D, the spacer holes 321 can be arranged in three circles. With reference to FIG. 3E, the spacer holes 321 can also be staggered. The disclosure is not meant to restrict the invention.

With reference to FIGS. 3A and 3B, in one embodiment, each spacer 32 includes a spacing portion 322 and a telescoping portion 323. Each conductive element 31 includes an annular portion 311 and an extending portion 312. The annular portion 311 is connected to one end of the extending portion 312. The annular portions 311 of at least a portion of the conductive elements 31 are telescoped on the telescoping portions 323 of at least a portion of the spacers 32. At least a portion of the spacers 32 are sandwiched between two of the annular portions 311. With reference to FIG. 2B, in this embodiment, the first annular portion 331 is not telescoped on the telescoping portion of the spacer.

With reference to FIG. 3C, in one embodiment, the telescoping portion 323 includes a chamfered edge 324. The chamfered edge 324 guides the annular portion 311 to be telescoped on the telescoping portion 323.

With reference to FIGS. 1A, 1B, 2A and 2B, in one embodiment, the first conductive element 33 includes a first bending portion 333. The first bending portion 333 is connected to the other end of the first extending portion 332. The second conductive element 34 includes a second bending portion 343. The second bending portion 343 is connected to the other end of the second extending portion 342. The first bending portion 333 and the second bending portion 343 are located between the second spacer 36 and the elbow connector 13.

With reference to FIGS. 1A, 1B, 2A and 2B, in one embodiment, the first bending portion 333 and the second bending portion 343 abut the elbow connector 13. Therefore, the first bending portion 333 and the second bending portion 343 are coupled to the elbow connector 13.

With reference to FIG. 2B, in one embodiment, the signal connection unit 3 further includes a first fastener 37 and a second fastener 38. The first fastener 37 wedges the first spacer 35. The second spacer 36 abuts a first side 381 of the second fastener 38. The first bending portion 333 and the second bending portion 343 abut a second side 382 of the second fastener 38.

In one embodiment, each conductive element is an integrally formed metal element. The annular portion, the extending portion and the bending portion are integrally formed. In one embodiment, the conductive element is bared with no sheath covered thereon. The disclosure is not meant to restrict the invention.

With reference to FIGS. 1A and 1B, in one embodiment, the first member 1 includes a first bracket 14. The first bracket 14 includes a first bracket stopper 141. The shaft 12 includes a shaft stopper 121. The signal connection unit 3 and the elbow connector 13 are sandwiched between the first bracket stopper 141 and the shaft stopper 121.

Figure 4A:
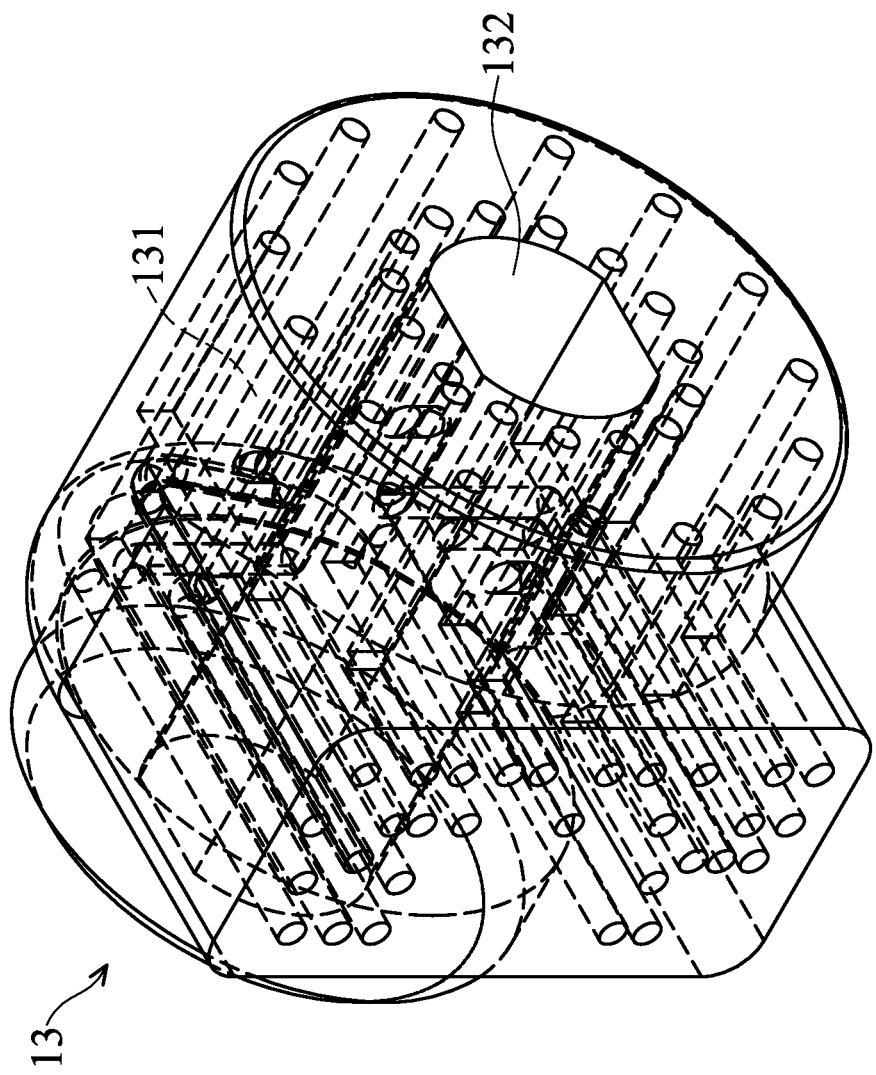
FIG. 4A shows the details of an elbow connector of the embodiment of the invention.

With reference to FIG. 4A, in one embodiment, the elbow connector 13 includes a plurality of elbow conductors 131. The elbow conductors 131 are bent at 90 degrees. The elbow conductors 131 couple the conductive elements to the first signal line. With reference to FIG. 1B, in this embodiment, the elbow connector 13 is connected to single one first signal line. In another embodiment, the elbow connector 13 can be connected to a plurality of first signal lines. The shape of the elbow connector 13 can be modified. The disclosure is not meant to restrict the invention. The elbow conductors 131 can be directly connected to the first signal line, or be coupled to the first signal line via elastic pins.

In another embodiment, each conductive element is integrally formed with one elbow conductor as one single metal element. Therefore, the annular portion and the extending portion of the conductive element are integrally formed with the elbow conductor. In this embodiment, the conductive elements have no bending portion.

Figure 4B:
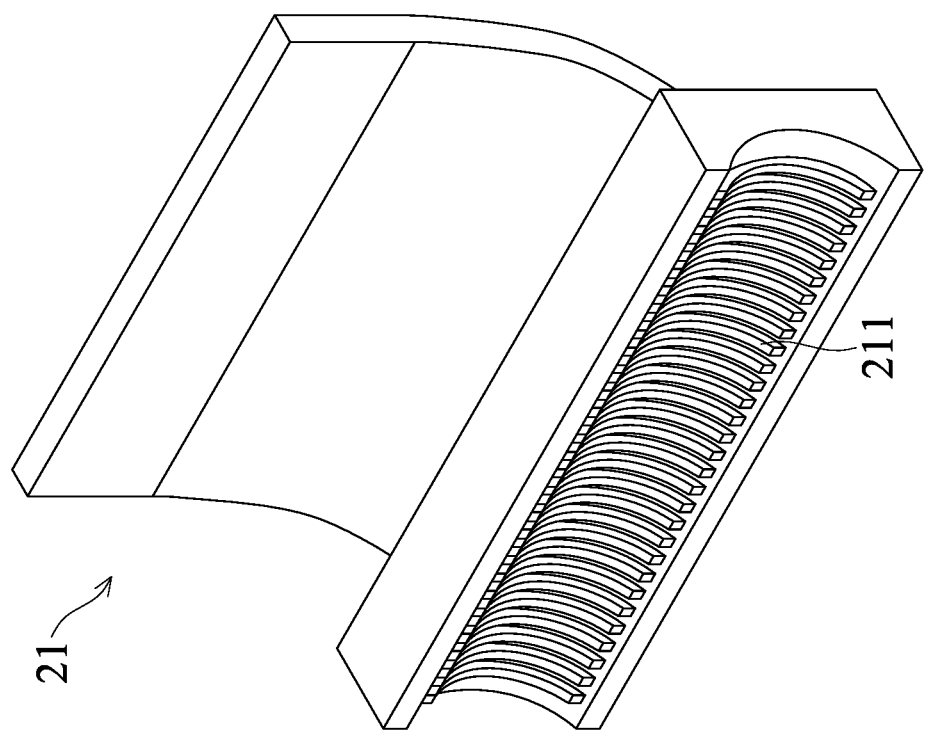
FIG. 4B shows a pivot connector pads of the embodiment of the invention.
Figure 4C:
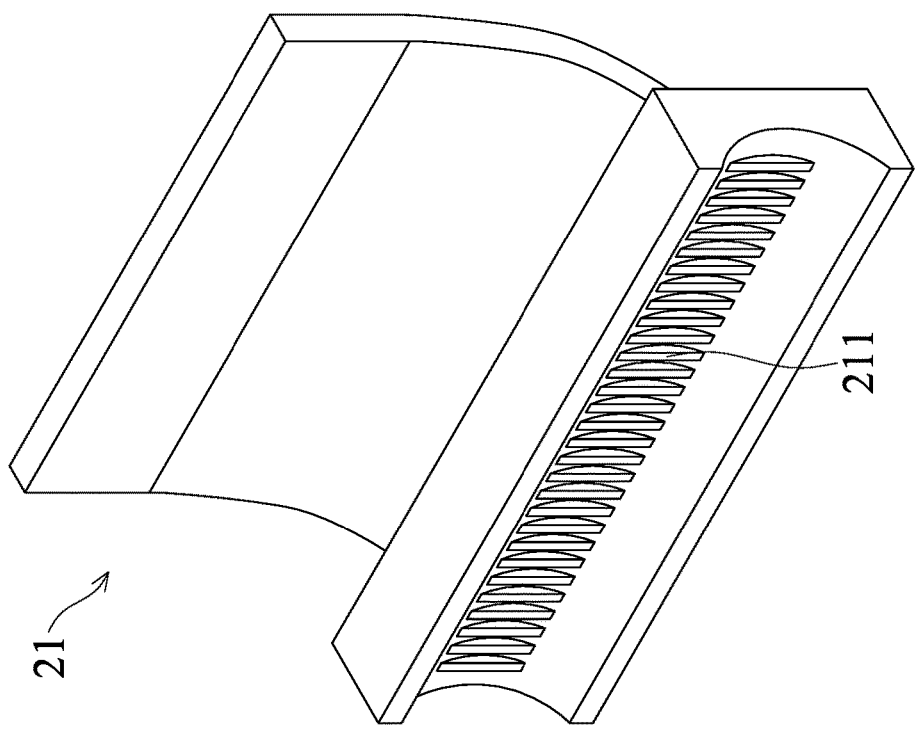
FIG. 4C shows a pivot connector pads of another embodiment of the invention.

With reference to FIGS. 4B and 4C, in one embodiment, the pivot connector 21 further includes a plurality of pivot connector pads 211. The pivot connector pads 211 respectively contact the annular portions of the conductive elements, and the pivot connector pads 211 are curved (FIG. 4B) or longitudinal (FIG. 4C).

Figure 4D:
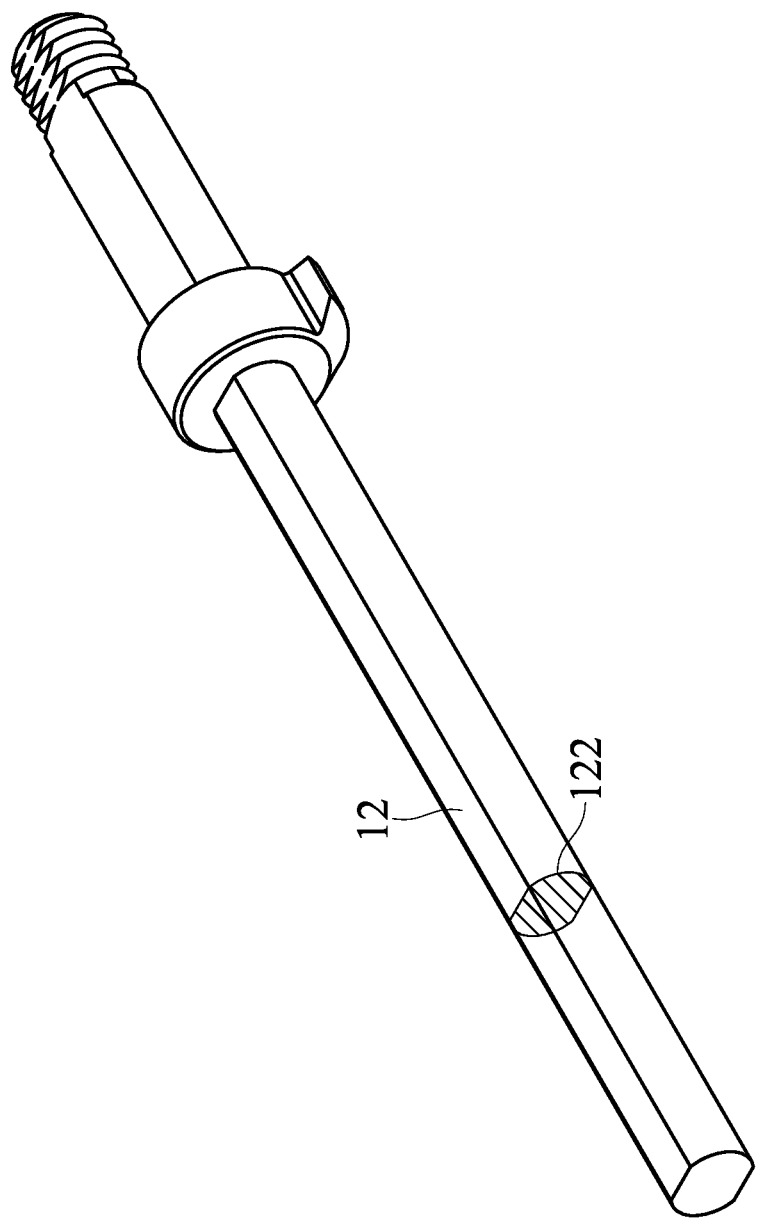
FIG. 4D shows the details of a shaft of the embodiment of the invention.

With reference to FIG. 4D, in one embodiment, the cross section 122 of the shaft 12 is non-round. With reference to FIG. 4A, the elbow connector 13 has an elbow connector through hole 132. With reference to FIG. 1B, the signal connection unit 3 has a signal connection unit through hole 301. The elbow connector through hole 132 and the signal connection unit through hole 301 are non-round. The elbow connector 13 and the signal connection unit 3 therefore wedge the shaft 12.

Figure 5A:
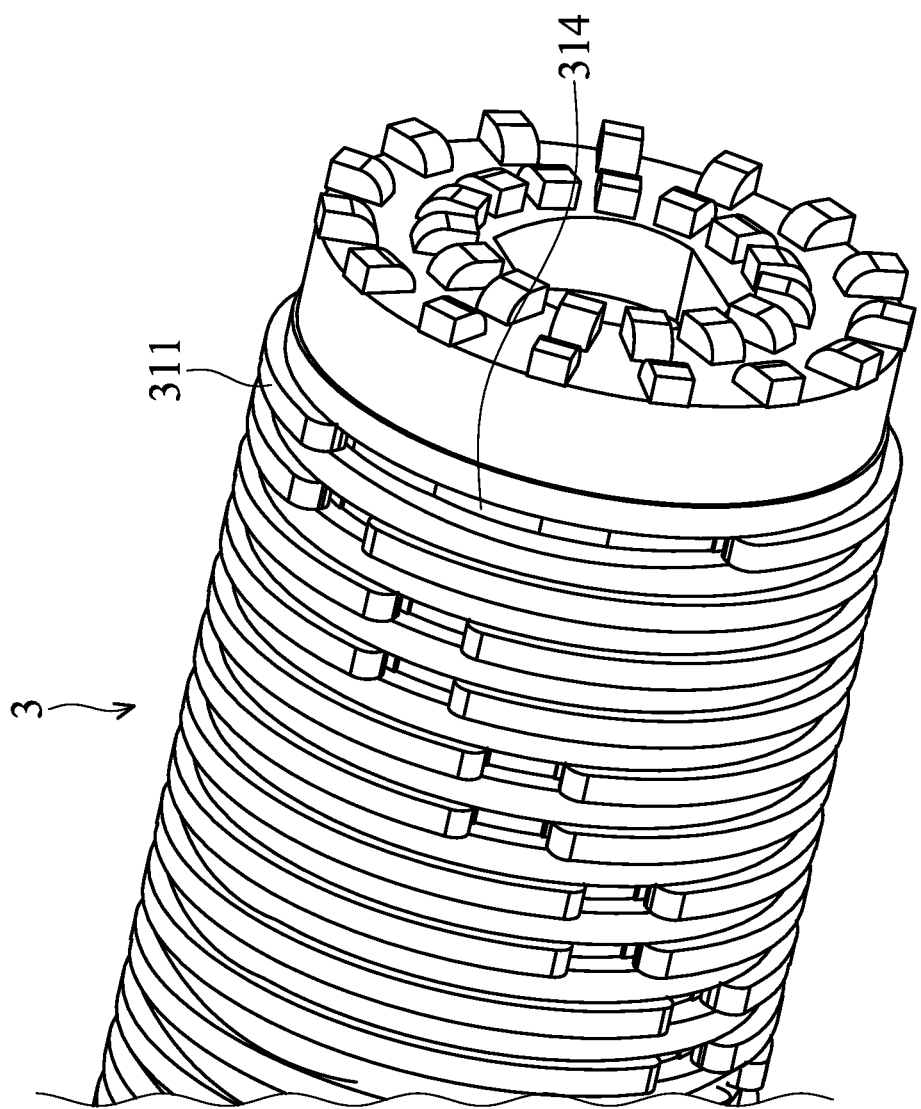
FIG. 5A shows the details of an annular portion of the embodiment of the invention, wherein the annular portion has a notch.
Figure 5B:
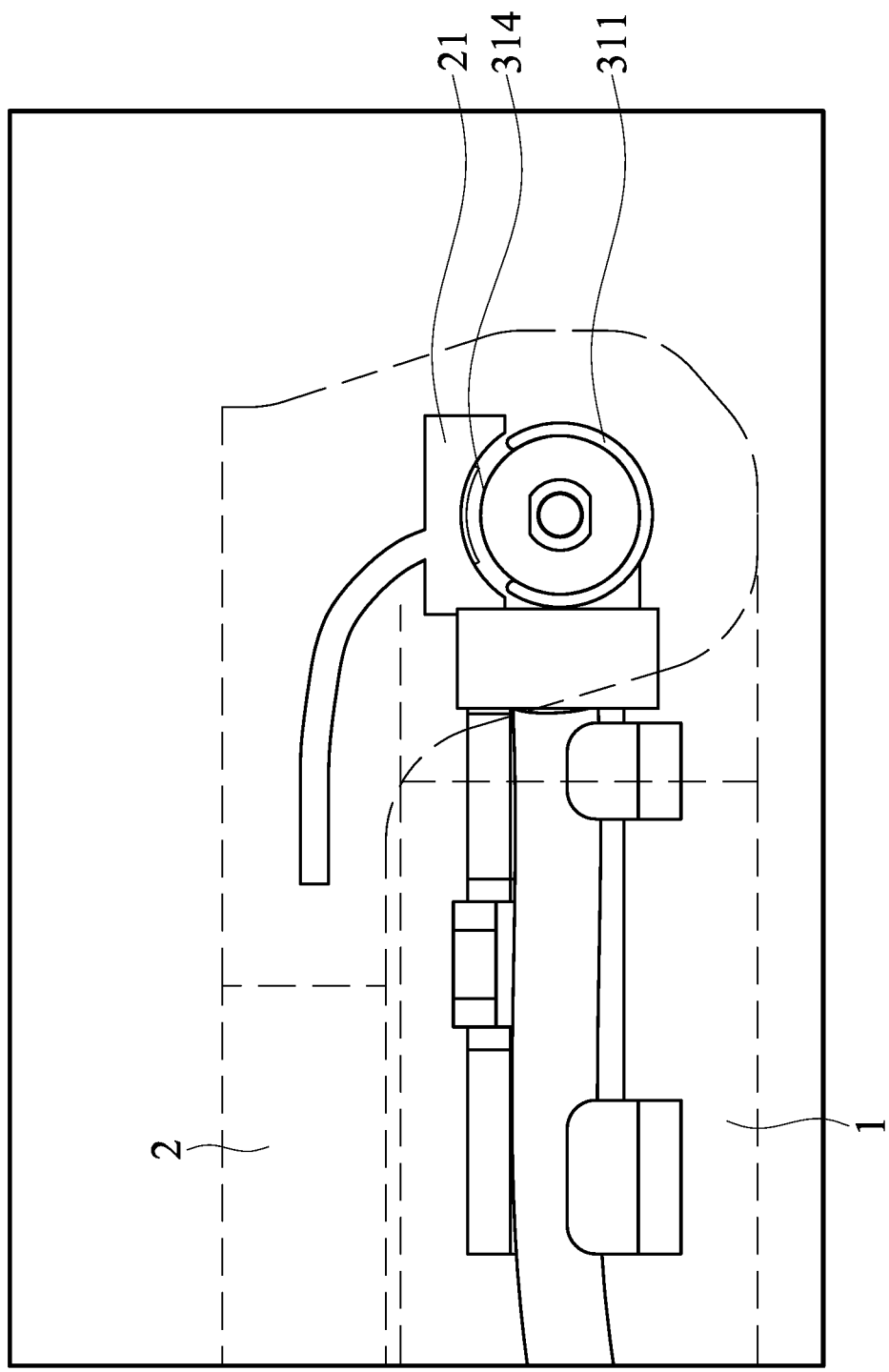
FIG. 5B shows a second member in a first orientation relative to a first member of the embodiment of the invention.
Figure 5C:
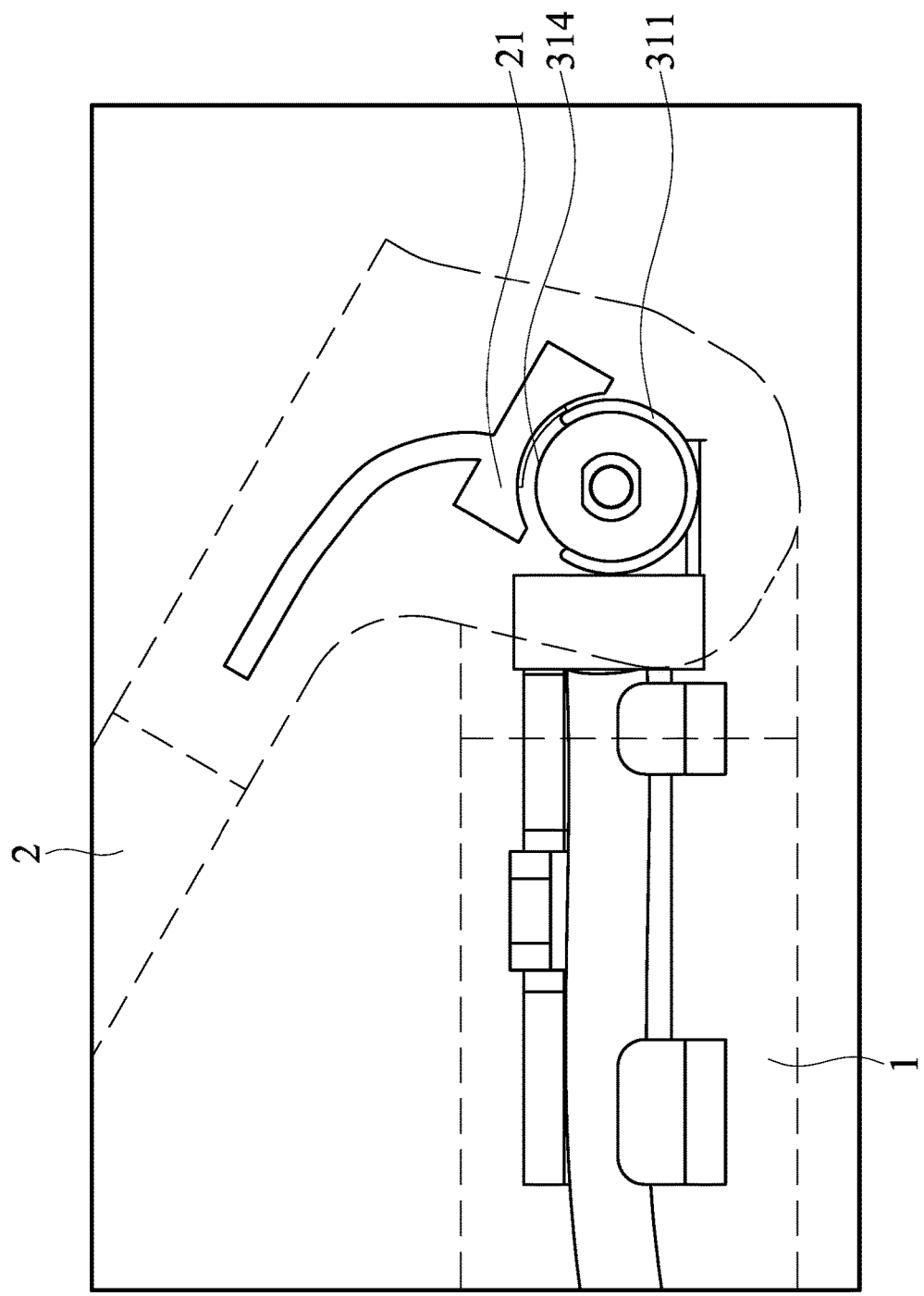
FIG. 5C shows the second member in the second orientation relative to the first member of the embodiment of the invention.

With reference to FIG. 5A, in one embodiment, the annular portion 311 has a notch 314. The second member 2 pivots between a first orientation (FIG. 5B) and a second orientation (FIG. 5C) relative to the first member 1. When the second member 2 is in the first orientation, one of the pivot connector pads 211 of the pivot connector 21 corresponds to the notch 314, the pivot connector pad 211 is electrically separated from the annular portion 311, and the conductive element 31 having the notch 314 does not transmit signal. When the second member 2 is in the second orientation, the all pivot connector pads 211 of the pivot connector 21 contact and are electrically connected to the annular portions 311, and the all conductive elements 31 transmit signals. Therefore, the electronic provides functions such as auto screen sleeping, auto screen lighting up, volume adjustment, silent, auto screen flip, close window, or full screen. The second member 2 can be rotated between 0 and 360 degrees relative to the first member 1. In another embodiment (not shown), the annular portions 311 of the conductive elements 31 have notches in different positions. Therefore, when the second member 2 is in a specific orientation relative to the first member 1, the specific pivot conductor pad 211 of the pivot conductor 21 is in the corresponding notch and is electrically separated from the annular portion 311, and the specific conductive element 31 does not transmit signals, and the electronic device can provide a specific function.

In general, the signal connection unit 3 electrically connects the first member 1 and the second member 2 in series as the first member 1, the first signal line 11, the elbow connector conductors 131 of the elbow connector 13, the conductive elements 31 of the signal connection unit 3, the pivot conductor pads 211 of the pivot conductor 21 and the second member 2. Additionally, the signal connection unit 3 can rotate the second member 2 relative to the first member 1. As well, when the second member 2 is in a different orientation relative to the first member 1, the electronic device can provide functions such as auto screen sleeping, auto screen lighting up, volume adjustment, silent, auto screen flip, close window, or full screen.

Figure 6A:
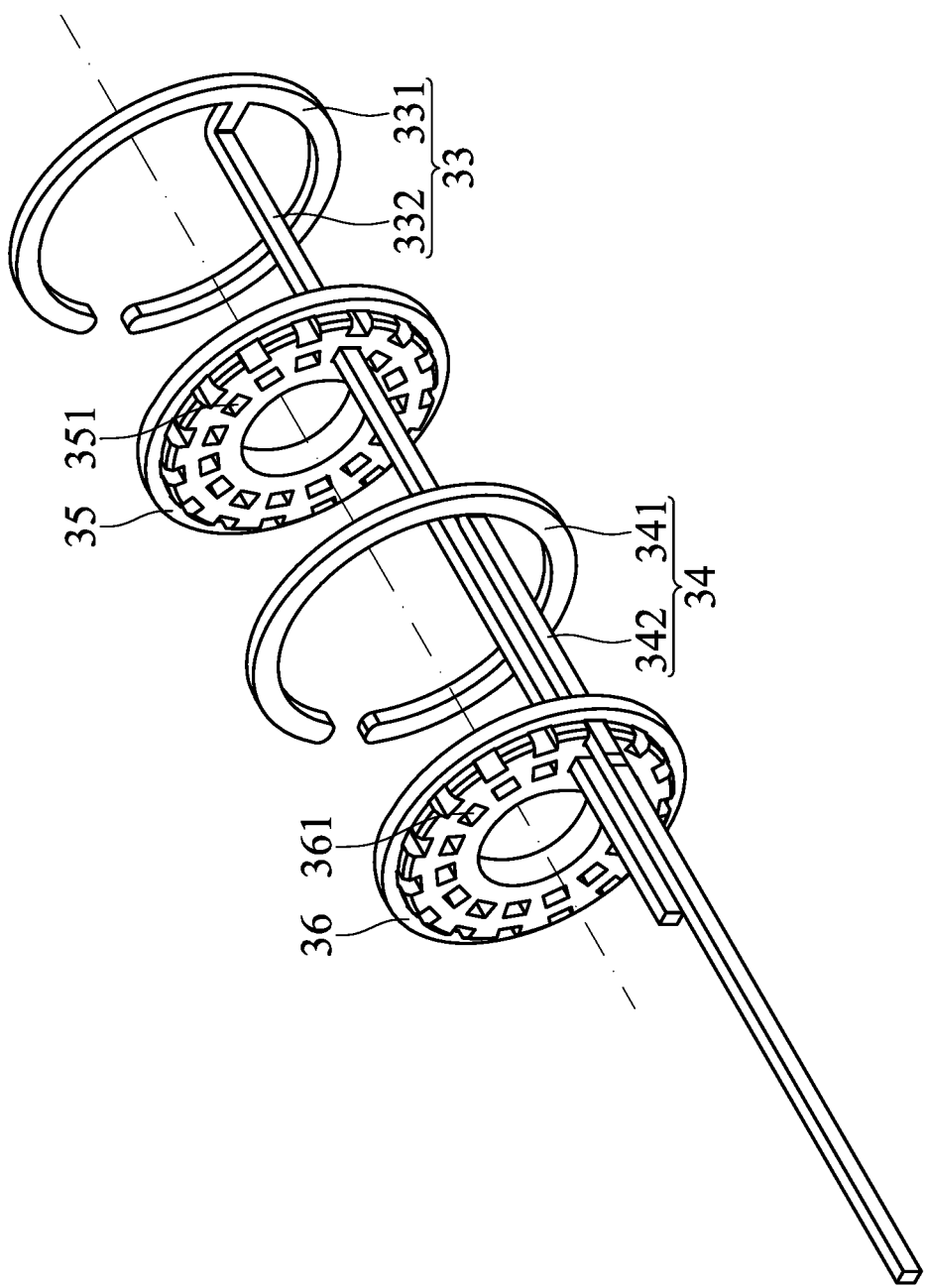
FIGS. 6A, 6B and 6C show a method for manufacturing a signal connection unit of the embodiment of the invention.

With reference to FIG. 6A, in one embodiment, a method for manufacturing a signal connection unit is provided. The method for manufacturing a signal connection unit includes the following steps. First, a plurality of conductive elements are provided, wherein the conductive elements include a first conductive element 33 and a second conductive element 34. The first conductive element 33 includes a first annular portion 331 and a first extending portion 332. The first annular portion 331 is connected to one end of the first extending portion 332. The second conductive element 34 includes a second annular portion 341 and a second extending portion 342. The second annular portion 341 is connected to one end of the second extending portion 342. Next, a plurality of spacers are provided, wherein the spacers include a first spacer 35 and a second spacer 36. The first spacer 35 includes a plurality of first spacer holes 351. The second spacer 36 includes a plurality of second spacer holes 361. Then, the first extending portion 332 passes through one of the first spacer holes 351, wherein the first annular portion 331 is connected to the first spacer 35. Next, the second extending portion 342 passes through one of the second spacer holes 361, wherein the second annular portion 341 is connected to the second spacer 36. Then, the first extending portion 332 passes through another second spacer hole 361, wherein the second annular portion 341 abuts the first spacer 35.

Figure 6B:
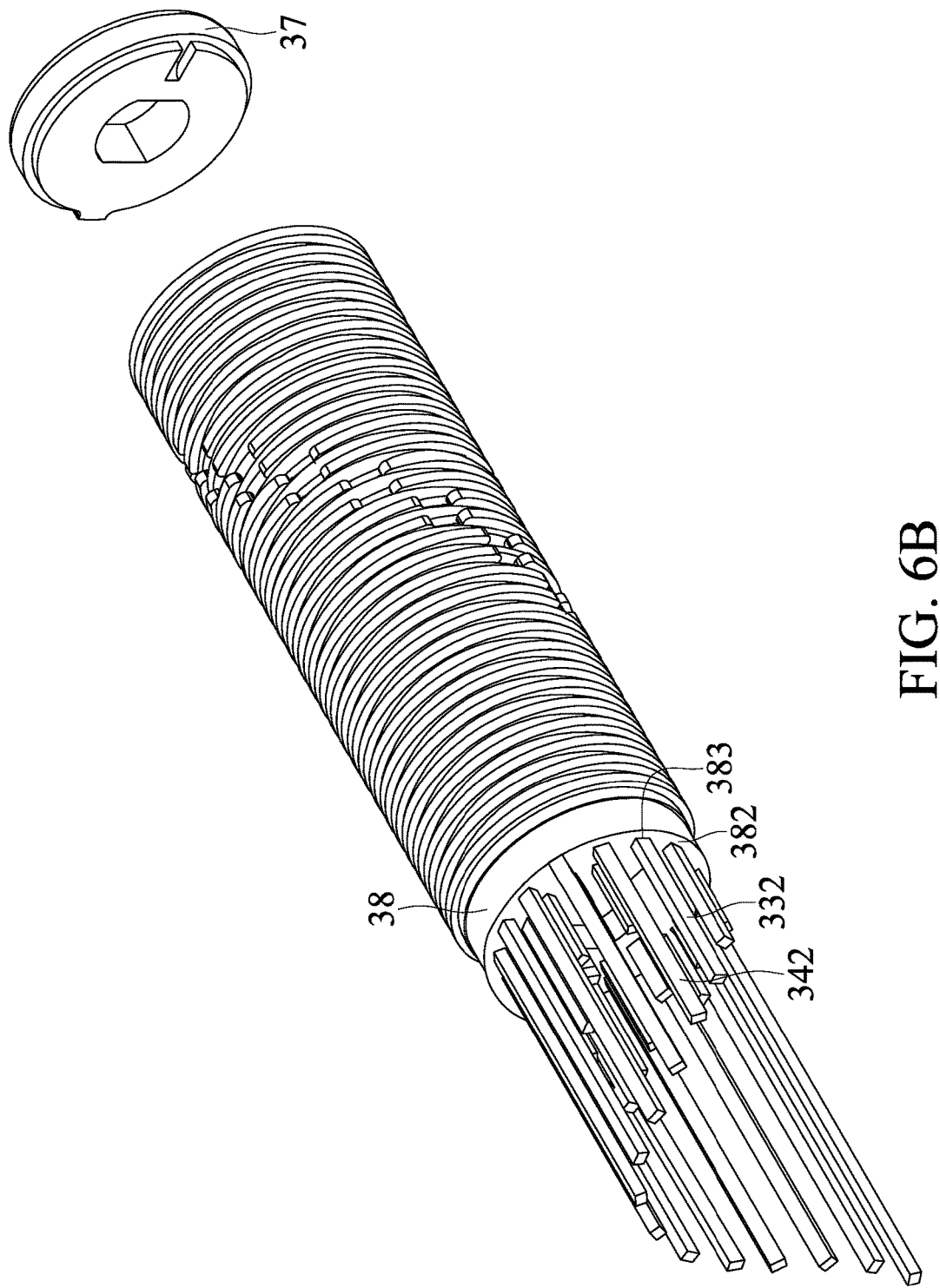
Figure 6C:
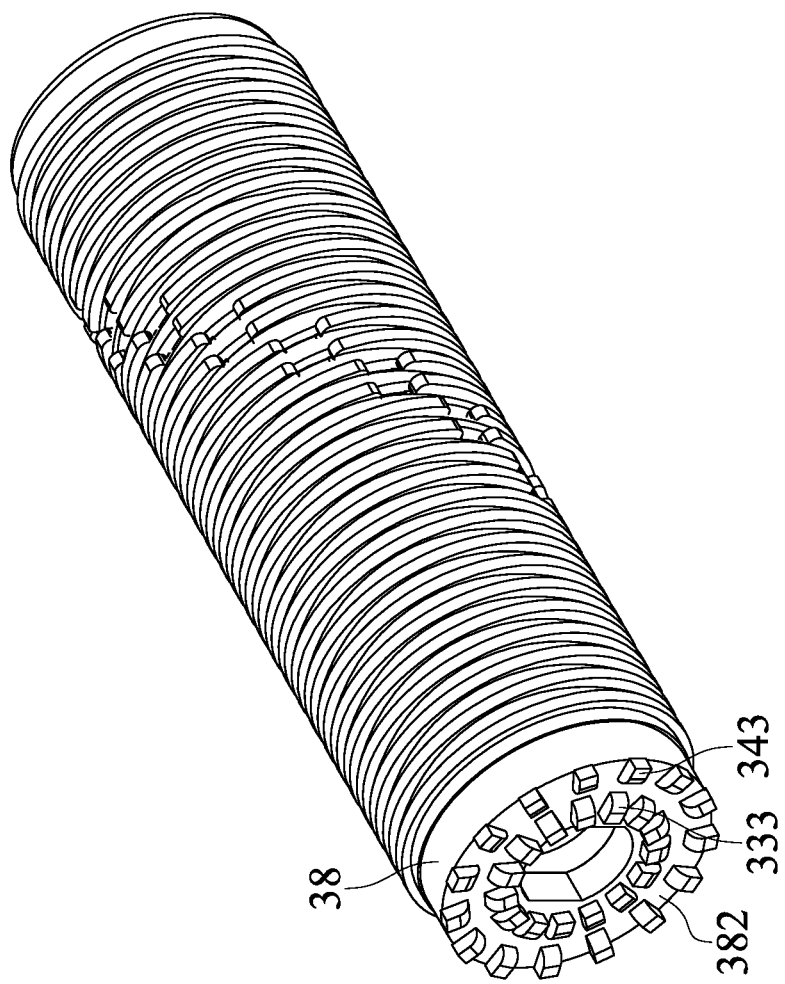

After the conductive elements and the spacers are stacked with each other, reference to FIG. 6B, a first fastener 37 and a second fastener 38 are provided. The second fastener 38 includes a plurality of fastener holes 383 (reference to FIG. 2B). Then, the first fastener 37 is wedged to one of the spacers. Next, the first extending portion 332 passes through one of the fastener holes 383, and passes through another fastener hole 383 with the second extending portion 342. After the extending portions of the all conductive element pass the fastener holes, with reference to FIG. 6C, the first extending portion 332, the second extending portion 342 and the extending portions of other conductive elements are cut off uniformly. Next, free ends of the first extending portion, the second extending portion and the extending portions of other conductive elements are bent, wherein a first bending portion 333 is formed on the free end of the first extending portion 332, a second bending portion 343 is formed on the free end of the second extending portion 342, and the other bending portions are formed on the extending portions of other conductive elements. The annular portions and the spacers are sandwiched between the first fastener 37 and the second fastener 38.

Figure 7A:
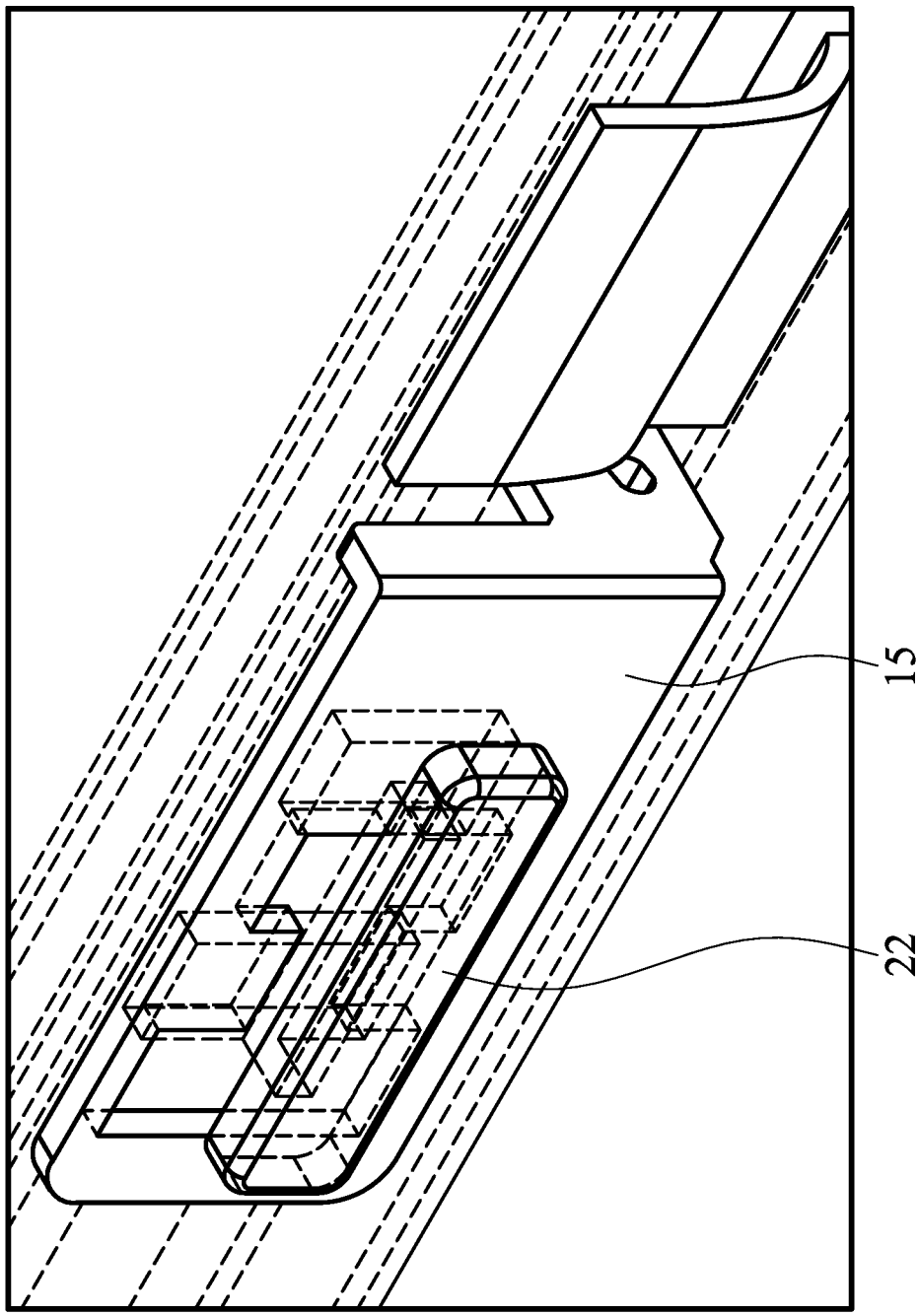
FIGS. 7A, 7B and 7C show a pivot bracket and the latch unit of the embodiment of the invention.
Figure 7B:
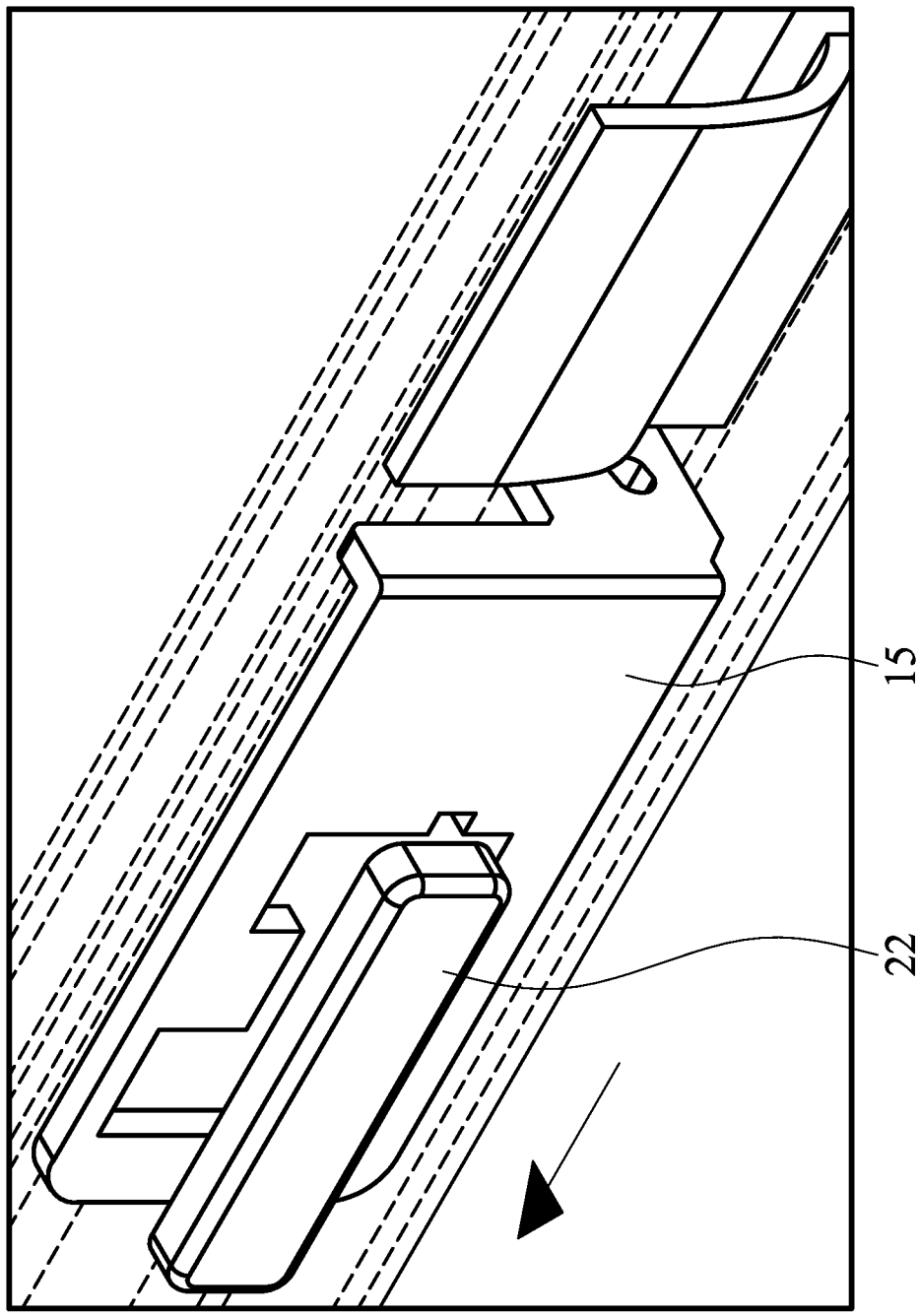
Figure 7C:
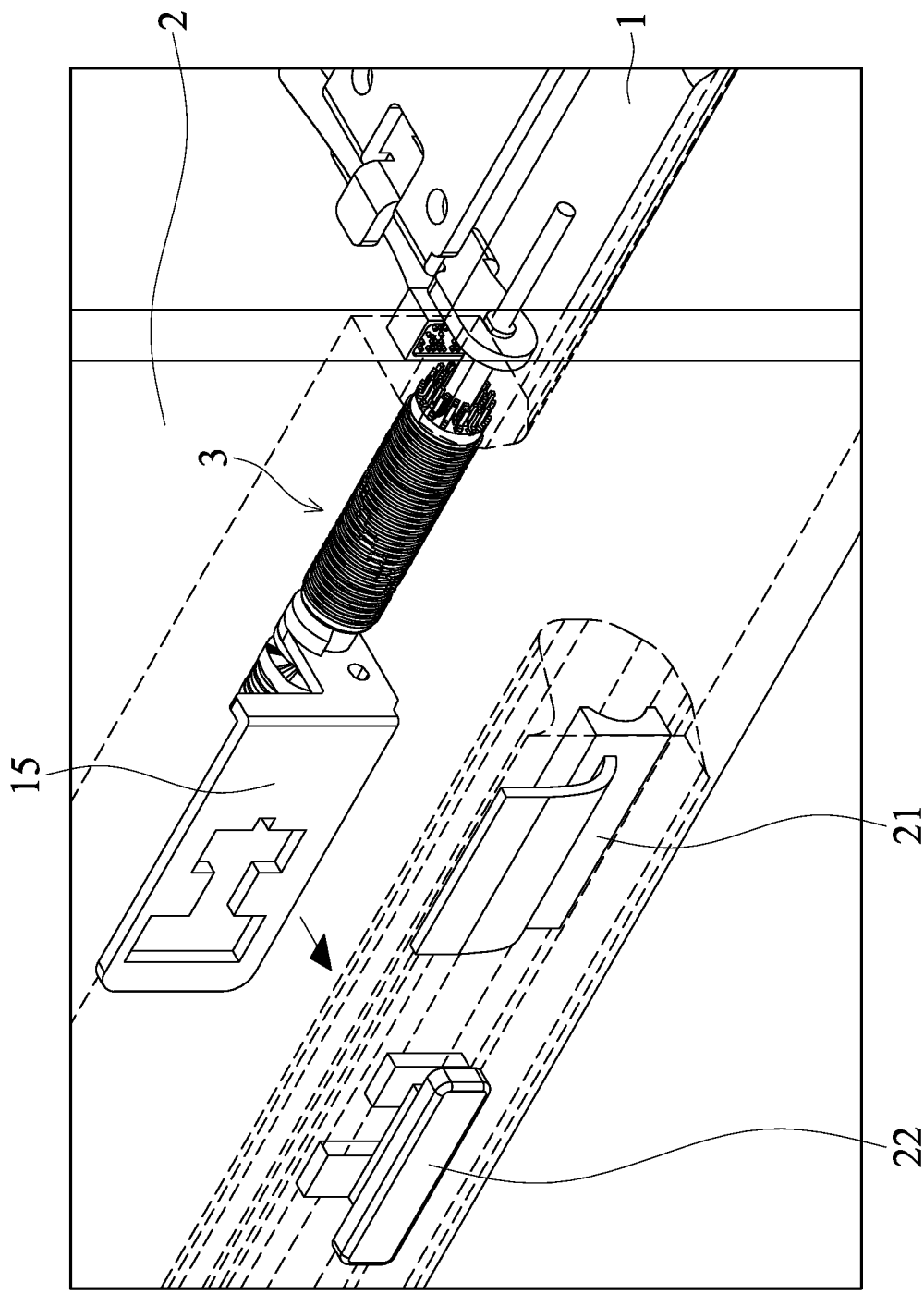

With reference to FIGS. 1A, 1B, 7A, 7B and 7C, in one embodiment, the first member 1 further includes a pivot bracket 15, the pivot bracket 15 pivots on the shaft 12. The second member 2 includes a latch unit 22, and the latch unit 22 is detachably connected to the pivot bracket 15. With reference to FIG. 7A, the second member 2 is connected to the pivot bracket 15 of the first member 1 via the latch unit 22. When it is desired that the second member 2 be separated from the first member 1, the user only needs to push the latch unit 22 (FIG. 7B), and the second member 2 separates from the first member 1 (FIG. 7C).

In the embodiments of the invention, the signal connection unit directly connects the pivot connector to electrically connect the first member and the second member. The conventional wire is omitted, and conventional problems such as insufficient route space and cable damage are prevented. Additionally, the conductive elements of the embodiment of the invention can easily be combined with the spacers, to become a signal connection unit with a plurality of pins. As well, utilizing the notch of the conductive element, the electronic device can provide functions such as auto screen sleeping, auto screen lighting up, volume adjustment, silent, auto screen flip, close window, or full screen, without an additional sensor.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
a first member, comprising:
a first signal line;
a shaft;
an elbow connector, coupled to the first signal line, wherein the elbow connector is telescoped on the shaft; and
a signal connection unit, telescoped on the shaft, comprising:
a plurality of conductive elements, comprising a first conductive element and a second conductive element, wherein the first conductive element comprises a first annular portion and a first extending portion, the first annular portion is connected to one end of the first extending portion, the second conductive element comprises a second annular portion and a second extending portion, the second annular portion is connected to one end of the second extending portion, and the first extending portion is parallel to the second extending portion; and
a plurality of spacers, comprising a first spacer and a second spacer, wherein the first spacer separates the first annular portion from the second annular portion, the first spacer comprises a plurality of first spacer holes, the first extending portion passes through one of the first spacer holes, the second spacer abuts the second annular portion, the second spacer comprises a plurality of second spacer holes, the first extending portion passes through one of the second spacer holes, the second extending portion passes through another second spacer hole, and the second spacer is located between the elbow connector and the second annular portion; and
a second member, connected to the first member, wherein the second member is adapted to pivot relative to the first member, comprising:
a pivot connector, connected to the signal connection unit, wherein the pivot connector is adapted to couple the first annular portion to the second annular portion.

2. The electronic device as claimed in claim 1, wherein each spacer comprises a plurality of spacer holes, and the spacer holes are arranged in a circumferential direction of the spacer.

3. The electronic device as claimed in claim 1, wherein each spacer comprises a plurality of spacer holes, and the spacer holes are arranged in a radial direction of the spacer.

4. The electronic device as claimed in claim 1, wherein each spacer comprises a spacing portion and a telescoping portion, each conductive element comprises an annular portion and an extending portion, the annular portion is connected to one end of the extending portion, the annular portions of at least a portion of the conductive elements are telescoped on the telescoping portions of at least a portion of the spacers, and at least a portion of the spacers are sandwiched between two of the annular portions.

5. The electronic device as claimed in claim 4, wherein the telescoping portion comprises a chamfered edge, and the chamfered edge guides the annular portion to be telescoped on the telescoping portion.

6. The electronic device as claimed in claim 1, wherein the first conductive element comprises a first bending portion, the first bending portion is connected to the other end of the first extending portion, the second conductive element comprises a second bending portion, the second bending portion is connected to the other end of the second extending portion, the first bending portion and the second bending portion are located between the second spacer and the elbow connector, and the first bending portion and the second bending portion abut the elbow connector.

7. The electronic device as claimed in claim 6, wherein the signal connection unit further comprises a first fastener and a second fastener, the first fastener wedges the first spacer, the second spacer abuts a first side of the second fastener, and the first bending portion and the second bending portion abut a second side of the second fastener.

8. The electronic device as claimed in claim 6, wherein the first conductive element is an integrally formed metal element, and the second conductive element is an integrally formed metal element.

9. The electronic device as claimed in claim 1, wherein the first member comprises a first bracket, the first bracket comprises a first bracket stopper, the shaft comprises a shaft stopper, and the signal connection unit and the elbow connector are sandwiched between the first bracket stopper and the shaft stopper.

10. The electronic device as claimed in claim 1, wherein the elbow connector comprises a plurality of elbow conductors, the elbow conductors are bent at 90 degrees, and the elbow conductors couple the conductive elements to the first signal line.

11. The electronic device as claimed in claim 10, wherein the first annular portion and the first extending portion of the first conductive element are integrally formed with one of the elbow conductors.

12. The electronic device as claimed in claim 1, wherein the pivot connector further comprises a plurality of pivot connector pads, the pivot connector pads respectively contact the conductive elements, and the pivot connector pads are curved or longitudinal.

13. The electronic device as claimed in claim 1, wherein the second member pivots between a first orientation and a second orientation relative to the first member, and when the second member is in the first orientation, the pivot connector is electrically separated from the first annular portion, and when the second member is in the second orientation, the pivot connector is coupled to the first annular portion.

14. The electronic device as claimed in claim 1, wherein the first member further comprises a pivot bracket, the pivot bracket pivots on the shaft, the second member comprises a latch unit, and the latch unit is detachably connected to the pivot bracket.

15. A method for manufacturing a signal connection unit, comprising:
providing a plurality of conductive elements, wherein the conductive elements comprise a first conductive element and a second conductive element, the first conductive element comprises a first annular portion and a first extending portion, the first annular portion is connected to one end of the first extending portion, the second conductive element comprises a second annular portion and a second extending portion, the second annular portion is connected to one end of the second extending portion;
providing a plurality of spacers, wherein the spacers comprise a first spacer and a second spacer, the first spacer comprises a plurality of first spacer holes, and the second spacer comprises a plurality of second spacer holes;
passing through one of the first spacer holes with the first extending portion, wherein the first annular portion is connected to the first spacer;
passing through one of the second spacer holes with the second extending portion, wherein the second annular portion is connected to the second spacer; and
passing through another second spacer hole with the first extending portion, wherein the second annular portion abuts the first spacer.

16. The method as claimed in claim 15, further comprising:
providing a first fastener and a second fastener, wherein the second fastener comprises a plurality of fastener holes;
wedging the first fastener to one of the spacers;
passing through one of the fastener holes with the first extending portion, and passing through another fastener hole with the second extending portion;
cutting off the first extending portion and the second extending portion; and
bending free ends of the first extending portion and the second extending portion, wherein a first bending portion is formed on the free end of the first extending portion, a second bending portion is formed on the free end of the second extending portion, and the spacers are located between the first fastener and the second fastener.

* * * * *